Feb. 2, 1960
LE ROY W. RANDT
2,923,176
POWER SHIFT TRANSMISSION MECHANISM
Filed July 10, 1956
4 Sheets-Sheet 3
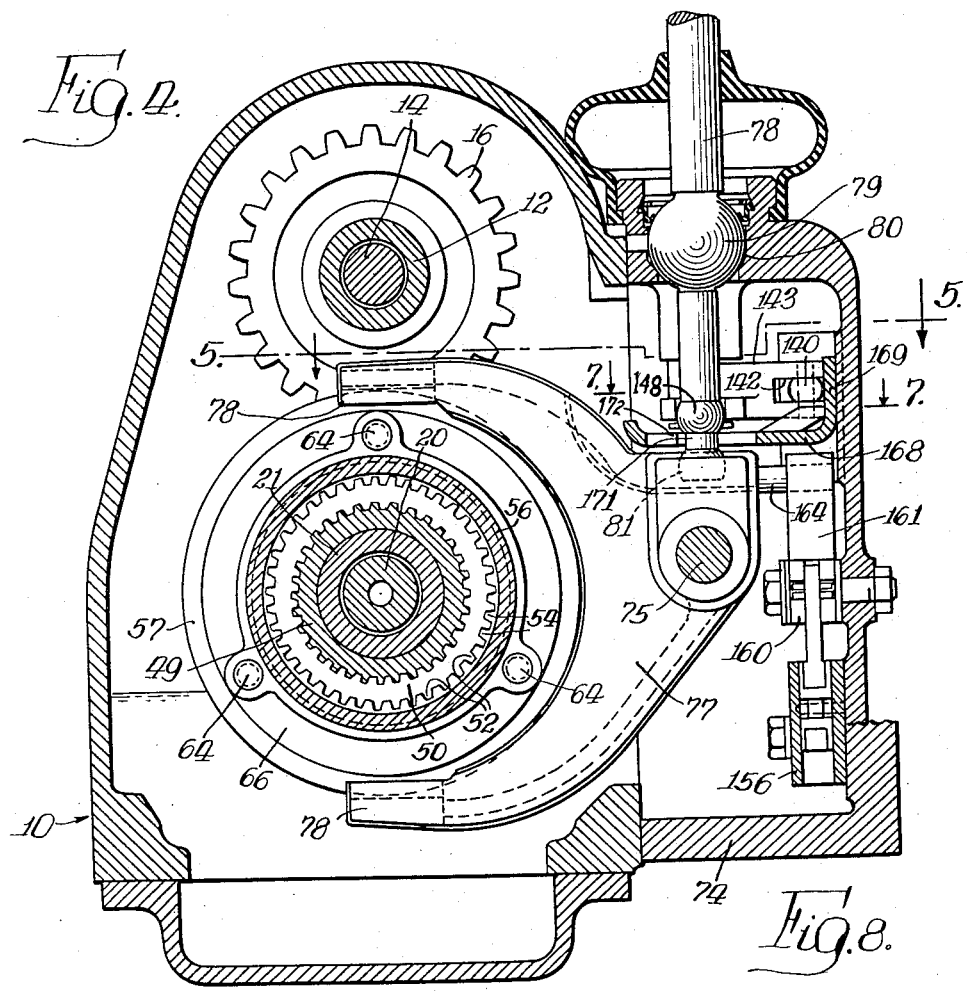
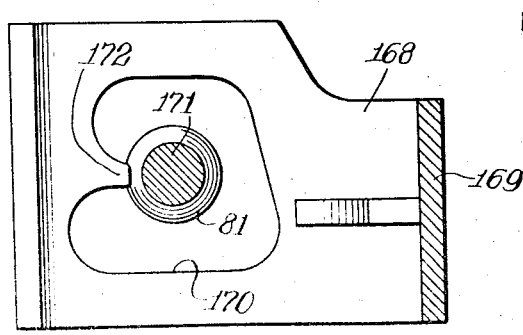
INVENTOR.
LeRoy W. Randt
BY John P. Smith
Atty.

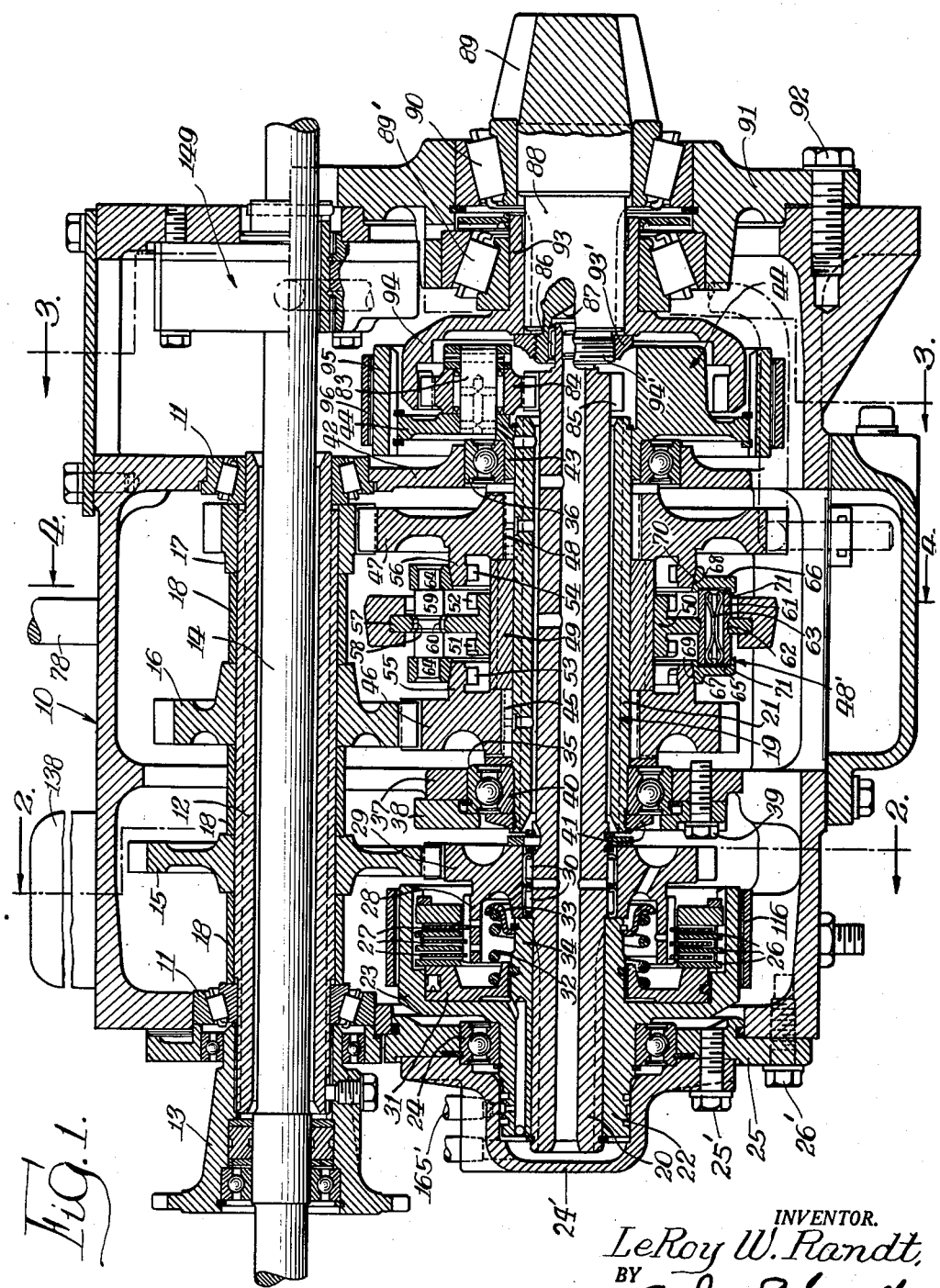

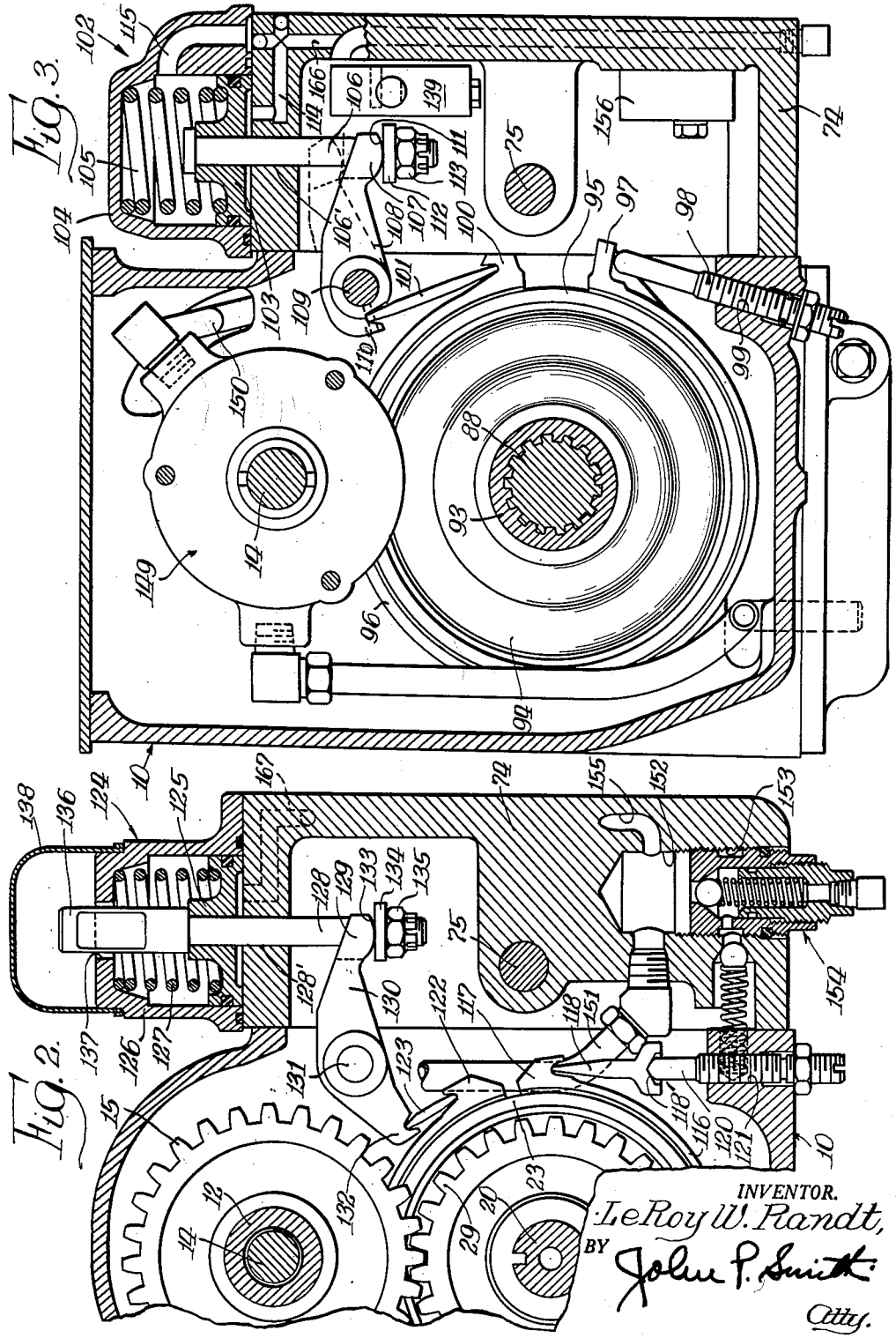

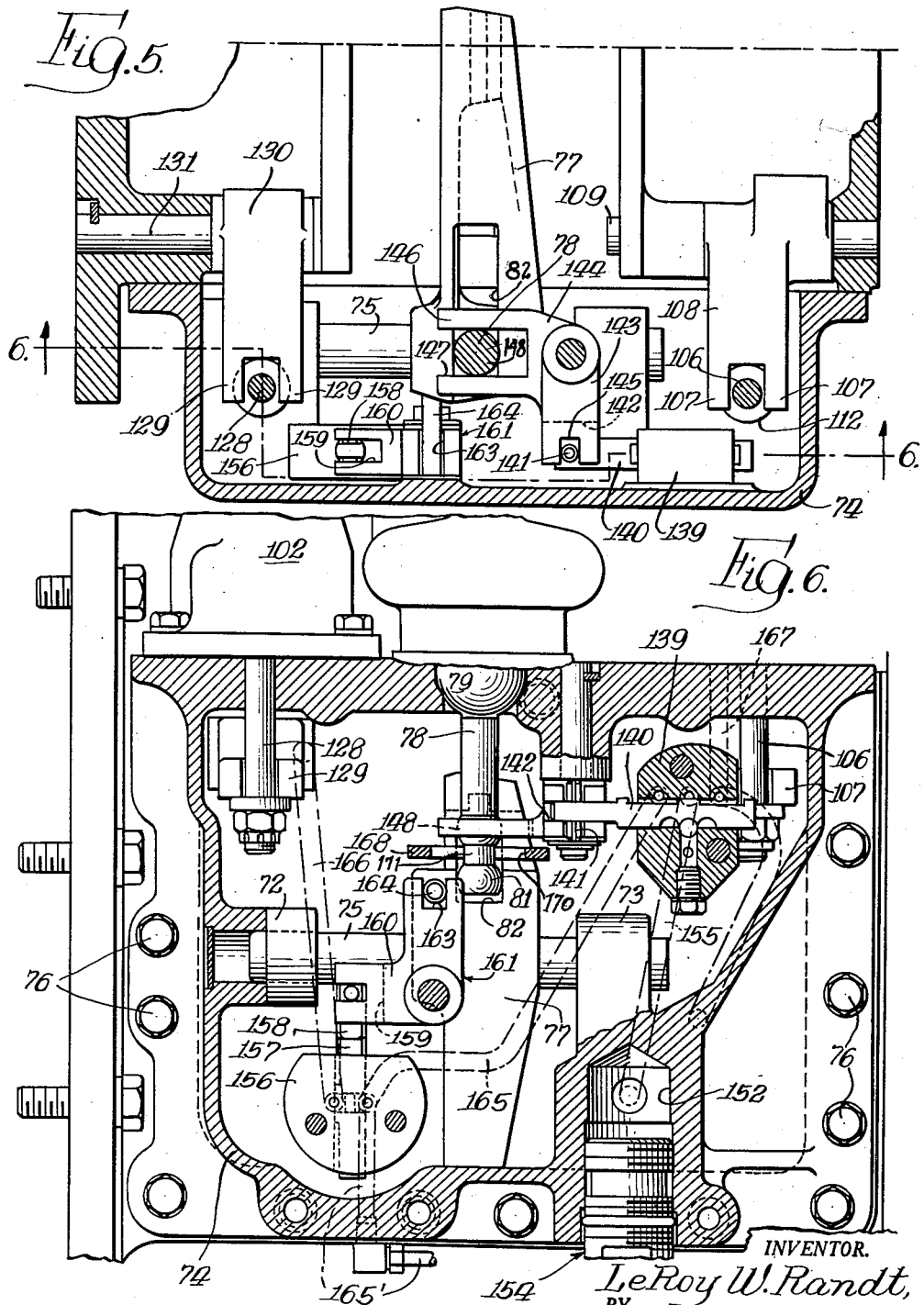

United States Patent Office 2,923,176
Patented Feb. 2, 1960

2,923,176

POWER SHIFT TRANSMISSION MECHANISM

Le Roy W. Randt, Buchanan, Mich., assignor to The Oliver Corporation, a corporation of Delaware Application July 10, 1956, Serial No. 596,872

14 Claims. (Cl. 74—740)

The present invention relates generally to a transmission mechanism for self-propelled vehicles and the like, but more particularly to a novel and improved transmission mechanism of the power shift type.

The primary object of the invention is to provide a novel, compact, and simplified construction of a power shift transmission mechanism in which a conventional type of gear shift lever is employed to shift a change of gears without releasing the driving clutch.

A further object of the invention is to provide a novel and improved power shift transmission mechanism which utilizes the combination of a planetary gear set with conventional countershaft gear set so as to obtain a maximum flexibility for ratio ranging and reduced gear loading due to drive line load division.

A further object of the invention is to provide a novel and improved transmission mechanism in which the combination of a synchronizer mechanism with a planetary gear set serves to function as a means of breaking the drive line so that the employment of the synchronizer can effect synchronization and eliminate gear clash.

A still further object of the invention is to provide a simplified and improved transmission mechanism in which the combination of a countershaft type of transmission and a planetary mechanism is utilized to feed the power at two points—one at the pinion carrier and the other at the sun gear to thereby secure a more efficient control of the desired gear ratio.

A further object of the invention is to provide a novel and improved transmission mechanism in which a smooth operation full power shift can be effected into reverse while the vehicle is under forward motion or to effect a similar smooth operation of the shift if it is desired to change to the forward motion while the vehicle is moving rearwardly.

Another object of the invention is to provide a power shift construction for a transmission mechanism in which a single manually operable lever coordinates or synchronizes the operation of the hydraulic clutch, the synchronizer, the brake band for effecting high and low speeds and the reverse band mechanism.

A still further object of the invention is to provide improved power shift construction for a transmission mechanism in which a novel combination includes an input shaft having gearing thereon, a countershaft having complementary gearing meshing with the input shaft gearing and a synchronizing mechanism carried by and operatively related to the countershaft gearing to effect a smooth operating full power shift.

These and other objects are accomplished by providing a construction and an arrangement of the various parts in the manner hereinafter described and particularly pointed out in the appended claims.

Referring to the drawings:

Fig. 1 is a longitudinally extending vertical cross-sectional view of my improved power shift transmission mechanism;

Fig. 2 is a fragmentary cross-sectional view taken on the line 2—2 in Fig. 1;

Fig. 3 is a cross-sectional view taken on the line 3—3 in Fig. 1;

Fig. 4 is a cross-sectional view taken on the line 4—4 in Fig. 1;

Fig. 5 is a fragmentary cross-sectional view taken on the line 5—5 in Fig. 4;

Fig. 6 is a fragmentary cross-sectional view taken on the line 6—6 in Fig. 5;

Fig. 7 is an enlarged fragmentary cross-sectional view taken on the line 7—7 in Fig. 4; and Fig. 8 is a diagrammatic view showing the plan of shift of the operating lever.

In illustrating one form which my improved power shift transmission mechanism may assume in practice, I have shown the same as comprising a main frame or housing, generally indicated by the reference character 10. Journaled in suitable spaced apart anti-friction thrust bearings 11 carried by the housing 10 is a longitudinally extending tubular input or drive shaft 12. The forward end of the drive shaft 12 is connected through a coupler 13 to the power plant or engine by means of a conventional clutch, a torque converter or a fluid coupling in a manner well understood in the art. Journaled in suitable anti-friction bearing and extending within the tubular input shaft 12 is a continuously driven power take-off shaft 14. Secured to the input shaft 12 are longitudinally spaced apart gears 15, 16 and 17 which are held in spaced apart relation by spacer sleeves 18. Mounted within the housing 10 and located vertically below and parallel to the input shaft 12 is a countershaft construction, generally indicated by the reference character 19. This countershaft construction 19 includes two concentrically arranged shafts, i.e., a sun gear shaft 20 and a tubular planet carrier shaft 21. The sun gear shaft 20 is mounted within the planet carrier shaft 21. Rigidly secured to the forward end of the shaft 20 is a hub 22 of a hydraulic clutch housing and brake drum member 23. The hub 22 is journaled in an anti-friction bearing 24 supported in a plate 25 which, in turn, is secured to the front side of the main frame 10 by bolts 26'. A cap member 24' embraces the forward end of the shaft 20 and hub 22 and is secured to the plate 25 by bolts 25'. Secured within the brake drum 23 are the conventional spaced apart clutch discs 26. Cooperating with the clutch discs 26 are similar clutch discs 27 which are secured to an annular sleeve 28 formed integrally with a gear 29 which, in turn, is journaled on the shaft 20 by anti-friction bearings 30. The gear 29 meshes with and is driven by the gear 15. Mounted within the clutch housing 23 is a longitudinally reciprocal hydraulically actuated piston 31. This piston is in the form of an annular ring of conventional construction and when actuated under hydraulic pressure, forces the clutch discs 26 and 27 into engagement for clutching the gear 29 to sun gear shaft 20. The clutch discs 26 and 27 are normally disengaged by a helical spring 32 which has one end engaging the rear side of the piston 31 and the other end engaging a spring receiving washer 33 secured to a rearwardly projecting hub 34 of the clutch housing 23. The planet carrier shaft 21 is journaled in front and rear anti-friction bearings 35 and 36 respectively. The bearing 35 is supported in an aperture in a vertical partition wall 37 of the housing 10 by a plate 38 secured to the wall 37 by bolts 39. The inner race 40 of the anti-friction bearing 35 is retained on the shaft 21 by an internally threaded nut 41 mounted in threaded engagement with the forward threaded end of the shaft 21. The other anti-friction bearing 36 is supported in an aperture in another vertically positioned partition wall 42 of the housing 10, and the inner race of this anti-friction bearing is supported on a forwardly extending hub 43 of a planet carrier 44. The hub 43 of the planet carrier 44 is rigidly secured to the rear end of the shaft 21. Journaled on the shaft 21 through the medium of a bearing sleeve 45 is a high range gear 46 which meshes with and is operatively driven by the gear 16. Journaled on the shaft 21 and spaced from the gear 46 is a second and relatively larger low range gear 47. The gear 47 is journaled on a bearing sleeve 48 surrounding the shaft 21. The gear 47 meshes with and is operatively driven by the gear 17 on the input shaft 12. Positioned between the two gears 46 and 47 and embracing the shaft 21 is a clutch and synchronizing assembly, generally indicated by the reference character 48'. This synchronizing assembly 48' is essentially like that disclosed in the L. A. Bixby Patent No. 2,667,955, issued February 2, 1954, and for a detailed description of the same, reference to this patent may be had. Briefly, this mechanism includes an externally splined hub 49 extending between the gears 46 and 47 and keyed to the shaft 21. Reciprocally mounted on the splined hub 49 is a clutch collar 50 which is adapted to rotate with the hub 49 and the shaft 21. The clutch collar member 50 has two sets of external jaw clutch teeth 51 and 52 which are adapted, respectively, to be selectively disposed in engagement with internal jaw clutch teeth 53 and 54 formed integrally with axially extending annular flanged portions 55 and 56 of the respective gears 46 and 47. The flanged portions 55 and 56 face in the direction of the clutch collar 50. The clutch collar 50 is provided with a radially extending flange portion 57 having a plurality of circumferentially spaced openings 58 extending therethrough, which openings 58 extend parallel to the axis of the shaft 21. The opposite edges of the openings 58 are countersunk. Disposed through alternate openings 58 in the flanged portion 57 of the clutch collar 50 are pins 59 having central annular grooves 60 with opposite tapered blocking shoulders. Disposed in the alternate openings 58 formed in the flange 57 are split pin assemblies 61 having central annular grooves 62 with opposite tapered shoulders therein. The split pin assemblies 61 comprise semi-cylindrical segments, between which segments are preferably disposed substantially X-shaped spring metal clip members 63. The members 63 are adapted to bias the semi-cylindrical portions of the split pin assemblies 61 apart and normally urge the central annular grooves 62 thereof into engagement with the inner peripheral surfaces of the adjacent openings 58 formed in the flange portion 57.

The pin members 59 have reduced end portions 64 which are rigidly secured as by riveting within openings formed in a pair of axially spaced synchronizer ring members 65 and 66 which are formed with annularly arranged internal tapered friction surfaces 67 and 68 adapted to cooperate, respectively, with the external tapered friction surfaces 69 and 70 formed on the axially extending annular flange portions 55 and 56 of the respective gears 46 and 47. Suitable circumferentially spaced apart recesses or sockets 71 are formed in the facing surfaces of the synchronizer ring members 65 and 66 which recesses 71 receive the ends of the split pin assemblies 61. Journaled for axial movement in spaced apart bosses 72 and 73 formed integrally with the housing section 74 is a shift rail 75. (See Figs. 4 and 5 of the drawings.) The housing section 74 is secured to the main housing 10 by means of bolts 76. Secured to the shift rail 75 between the bosses 72 and 73 is a shifter fork 77 which is provided with oppositely disposed fork portions 78 engageable with the upper and lower portions of the flange 57 of the clutch collar 50 for effecting axial movement of the clutch collar 50. Axial movement of the shift rail 75 and the fork 77 is effected in a conventional manner by means of a shifter lever 78. The lever 78 is provided intermediate its ends with a ball portion 79 which is seated in a socket 80 in the upper portion of the housing section 74 in a manner well understood in the art. The lower end of the lever 78 is provided with rounded portion 81 which is adapted to engage a transverse recess 82 in the upper portion of the fork 77.

Upon the rotation of the input or drive shaft 12, drive may be selectively effected to drive planet carrier shaft 21 through either the gears 16 and 46 or gears 17 and 47. The driving connection through gears 17 and 47 is established through the synchronizer 48' by the initial movement of the clutch collar member 50 to right (as viewed in Fig. 1 of the drawings) by shifting the hand lever 78 forwardly. As the clutch member 50 is shifted to the right, it carries the synchronizer rings 65 and 66 therewith, since the central annular grooves 62 of the split pin assemblies 61 are biased into engagement with the peripheries of the openings 58 in the flange portion 57. Further axial movement of the clutch collar 50 to the right causes the internal tapered friction surface 68 of the synchronizer ring 66 to be disposed into frictional engagement with the external tapered friction surface 70 on the annular flange portion of the gear 47. Slip occurs during initial engagement of the tapered friction surfaces 68 and 70 until the gear 47 and synchronizer ring 66 rotate synchronously. After the tapered friction surfaces 68 and 70 have been fully engaged and they rotate synchronously, the shoulders on the pins 59 no longer block axial movement of the clutch collar 50 relative to the synchronizer rings 65 and 66.

Initial axial movement of the clutch collar 50 relative to the synchronizer rings 65 and 66 causes the portions of the split pin assemblies 61 to compress or collapse, which cocks the latter and effects snap engagement of the jaw clutch teeth 52 of the clutch collar 50 with the jaw teeth 54 on the gear 47, thus providing a positive direct drive between the gear 47 and the planet carrier shaft 21.

In a like manner, the clutch collar 50 may be moved axially to the left from the position shown in Fig. 1 of the drawings, by the control lever 78 through the shift fork 77. Since engagement of the jaw clutch teeth 51 of the clutch collar 50 is effected in the same manner as above described, it is believed that a detailed description thereof is unnecessary. When the jaw clutch teeth 51 are disposed in engagement with the jaw clutch teeth 53, a different drive ratio is effected between the input shaft 12 and the planet carrier shaft 21 through gears 16 and 46.

Secured at uniformly spaced apart intervals and projecting from the rear face of the planet carrier 44 are three planetary pinion shafts 83 on which are journaled planetary pinions 84 which mesh with a sun gear 85 formed integrally with or secured adjacent the rear end of the sun gear shaft 20. The rear end of the sun gear shaft 20 is journaled in an anti-friction bearing 86 supported in an axial recess 87 formed in the forward end of an output shaft 88. The output shaft is provided with the usual bull pinion 89. The output shaft 88 is journaled in two oppositely disposed anti-friction thrust bearings 89' and 90 suitably supported in a removable plate 91 secured to the main housing 10 by means of bolts 92. Secured to the forward portion of the output shaft 88 by a key or otherwise, is the hub 93 of an internal ring gear 94. The hub 93 of the ring gear 94 is retained on the shaft 88 by a threaded nut 93' mounted on a forwardly extending threaded extension 94' of the output shaft 88. The ring gear 94 meshes with and is operatively driven by the planetary pinions 84. Rigidly secured to or formed integrally with the planet carrier 44 is an annular brake drum 95. Engageable with and encircling the brake drum 95 is an annular reverse speed brake band 96. The brake band 96 is of the split type and has one free end, as shown at 97, engaged by an angularly disposed adjustable bolt 98 mounted in threaded engagement with a threaded bore 99 in the lower portion of the housing 10. (See Fig. 3 of the drawings.) The other free end of the brake band 96 is provided with a hook-like bracket 100 in which is seated a flat link member 101. The brake band 96 is actuated to stop or hold the planet carrier 44 by a hydraulic mechanism generally indicated by the reference character 102, which includes a piston 103 reciprocally mounted in a vertically disposed cylinder 104 secured to the top side of the housing section 74. The piston is normally actuated to its lowermost position by a spring 105. Secured to the axial center of the piston 103 is a downwardly projecting piston rod or bolt 106. The piston rod 106 projects through an aperture 106' in the top of the housing section 74. The lower end of the bolt is connected to the bifurcated end 107 of a rocker arm 108 which, in turn, is pivoted on a pin 109 suitably supported in the housing 10. The inner end of the rocker arm 108 has a hook portion 110 which engages the upper end of the link connection 101. The bifurcated end 107 of the rocker arm 108 has a curved portion 111 which rests on a washer 112 embracing the bolt 106 and is retained thereon by a nut 113 mounted in threaded engagement with the threaded end of the bolt 106. Fluid pressure passageways 114 leading from a valve and source of fluid pressure and communicating with cylinder 104 below the piston 103 will hereinafter be more fully described. An exit air pressure passageway 115 permits the free operation of the piston 103 in the cylinder 104.

Surrounding the brake drum member 23 is a split brake band 116. Secured to one end of the brake band 116 is a hook-like bracket 117 which is engaged by vertically disposed pointed connection 118 which has a tapered recess 118' in the lower end thereof. Seated in the recess 118' is an adjustable threaded bolt 120 which is mounted in a threaded bore 121 in the lower portion of the housing 10. This adjustment permits the varying of the tension on the brake band 116 when required. The other end of the brake band 116 is provided with a hook-like bracket 122 in which is seated a connecting link 123.

The brake band 116 is actuated to stop or brake the brake drum 23 in effecting second and fourth speed of the transmission mechanism by a hydraulic mechanism generally indicated by the reference character 124 which includes a piston 125 reciprocally mounted in a cylinder 126 secured to the top side of the housing section 74. The piston 125 is normally actuated to its lowermost position by a spring 127 mounted within the cylinder 126 and engaging the top side of the piston 125. A piston rod 128 connected to the piston 125 reciprocates in an opening 128' in the top side of the housing section 74. The piston rod connection 128 is operatively connected to a bifurcated end 129 of a rocker arm 130 which, in turn, is pivoted on a pin 131 supported in the main housing 10. The other end of the rocker arm 130 has a hook portion 132 which engages the upper end of the link 123. (See Fig. 2 of the drawings.) The bifurcated portions 129 of the rocker arm 130 are rounded, as shown at 133, and ride on a washer 134 retained on the bolt 132 by a threaded nut 135. The upper enlarged portion 136 of the piston rod 128 extends through an enlarged aperture 137 in the top end of the cylinder 126. A metal cap 138 encases the upper end of the cylinder 126. The hand lever 78 is operatively connected with the various valve mechanisms to not only synchronize their operation in connection with the change of speed and the reverse speed, but to also operate the synchronizing assembly or unit in proper timed relation with the braking mechanism.

One of the valve mechanisms which controls the operation of the hydraulic annual piston 31 and disc clutch 26—27 for clutching the gear 29 to the sun gear shaft 20, includes a valve mechanism within a casing 139 suitably secured to the inside of the housing section 74. (See Figs. 5 and 6 of the drawings.) Reciprocally mounted in a suitable bore within the valve casing 139 is a valve spool 140. Located adjacent the rear end of the spool 140 is a vertically disposed pin 141 which projects from the opposite sides of the spool 140. The spool 140 extends horizontally through a slot 142 in a transversely extending arm 143 of the bell-crank 144. The oppositely disposed portions of the free end of the arm 143 are slotted, as shown at 145, which slots, in turn, engage the oppositely projecting portions of the pin 141. The other arm of the bell-crank, as shown at 146, is located at right angles to the arm 143 and is provided with a longitudinally extending slot 147. The slot 147 is adapted to freely receive a second enlarged rounded diametral portion 148 formed integrally with the lever 78 at a point adjacent the lower end thereof. The bell-crank 144 is actuated by the lateral movement only of the lever 78 and such lateral movement actuates the valve spool 140 to selectively and alternately energize the clutch discs 26—27 or the brake band 116. The source of fluid pressure is derived from a pump, generally indicated by the reference character 149 which is driven by the engine in any suitable manner. The pressure side of the pump 149, as indicated at 150, is connected to a conduit 151 (only a portion of which is shown in Figs. 2 and 3 of the drawings) which, in turn, is connected to a cylindrical recess or fluid pressure chamber 152 in the lower end of the housing section 74. (See Fig. 2 of the drawings.) Mounted in the threaded portion 153 of the recess 152 is a conventional relief valve, generally indicated by the reference character 154. (See Figs. 2 and 6 of the drawings.) The fluid pressure chamber 152 is connected by a conduit 155 to the valve spool bore in valve casing 139.

A second valve mechanism, which controls the actuation or energization of reverse brake band mechanism 96, includes a valve casing 156 suitably mounted in the housing casing 74. (See Figs. 5 and 6 of the drawings.) Vertically reciprocable in the valve casing 156 is a valve spool 157. The upper end of the spool 157 is flattened as shown at 158 and extends into a vertical slot 159 located in the free end of an arm 160 of a bell-crank, generally indicated by the reference character 161. A second right angularly disposed arm 162 of the bell-crank 161 is slotted, as shown at 163, and is adapted to freely receive a laterally projecting pin 164 secured to the upper portion of the fork member 77. The purpose of this arrangement of the control valve 157 is to energize the hydraulic cylinder 104 only when the shift fork 77 is in neutral position and the shift lever 78 is displaced laterally in the direction normally to energize the disc clutch 26—27. Under the above conditions, the planet carrier 44 is restrained and the gear 29 is clutched to the sun gear shaft 20 to thereby drive the output shaft 88 in reverse direction.

The fluid pressure is supplied to the valve 156 by a conduit 165 leading from the valve 139 to the valve 156. Another conduit 165' (see Figs. 1 and 6 of the drawings) communicates with the conduit 165 for furnishing fluid pressure to the hydraulically actuated clutch 26—27. Fluid pressure in the conduit 165 is supplied or controlled by the valve 139 when the hand lever 78 is laterally disposed in first, third and reverse positions, as is diagrammatically shown in Fig. 8 of the drawings. The fluid under pressure is supplied to the cylinder 104 through the conduit 166 leading from the valve 156 and connected to the passageway 114 when the hand lever 78 is in reverse position, as shown in Fig. 8 of the drawings.

Another conduit 167 leading from the valve 139 to the hydraulic cylinder 126 is supplied with fluid pressure when the hand lever 78 is laterally disposed in second and fourth positions, as shown in Fig. 8 of the drawings.

A shift lever plate 168, shown in Figs. 4 and 7 of the drawings, is provided with a right angularly disposed portion 169 for securing the same to the inner vertical wall of the housing section 74. The shift lever plate 168 is provided with cut-out portion 170 which guides and engages the reduced portion 171 of the lever 78 between the spaced apart rounded portions 81 and 148 of the lever 78. This shift lever plate 168 has an inwardly extending projection 172 which prevents the lever 78 from being shifted laterally except in one direction from neutral position so that under the circumstances, it is only possible to shift the lever 78 into the positions shown in Fig. 8 of the drawings.

In the operation of my improved power shift transmission, the different speeds are accomplished in the following manner: First speed is derived by clutching the gear 47 to the planet carrier shaft 21 by means of the synchronizer assembly 48'. At the same time, the sun gear shaft 20 is clutched to the gear 29 by means of the clutch disc 26—27, thereby driving the sun gear shaft 20 by the input shaft 12 through the gear 15 and driving the planet carrier shaft 21 by input shaft 12 through the gear 17.

The second speed is derived by clutching the gear 47 to the planet carrier shaft 21 by means of the synchronizer assembly 48'. At the same time, the sun gear shaft 20 is restrained from rotation by the brake band 116, in which case the input shaft 12 drives the planet carrier shaft 21 by the gear 17.

The third speed is derived by clutching the gear 46 to the planet carrier shaft 21 by means of the synchronizer assembly 48'. At the same time the sun gear shaft is clutched to the gear 29 by means of the clutch discs 26—27, thereby driving the sun gear shaft 20 by the input shaft 12 through the gear 15 and driving the planet carrier shaft 21 by input shaft 12 through the gear 16.

The fourth speed is derived by clutching the gear 46 to the planet carrier shaft 21 by means of the synchronizer assembly 48'. At the same time, the sun gear shaft 20 is restrained from rotation by the brake band 116, in which case the input shaft 12 drives the planet carrier shaft 21 by the gear 16.

The reverse speed is derived by placing the synchronizer assembly in neutral position, as shown in Fig. 1 of the drawings. The planet carrier shaft 21 is restrained by brake band 96 and at the same time, the sun gear shaft 20 is clutched to the gear 29 by means of the clutch discs 26—27, thereby driving the sun gear shaft 20 by the input shaft 12 through the gear 16.

Summarizing the important features of construction and functions of operation of my improved power shaft transmission, it will be readily understood that by providing a countershaft between the input shaft and the output shaft with a synchronizing mechanism and a planetary mechanism carried by the countershaft, a very compact and simplified construction of a power shift mechanism is accomplished. It is further pointed out that the planetary gear mechanism in this combination serves to function as a means of breaking the drive line so that the synchronizing mechanism effects a smooth synchronization in the change of speeds and eliminates gear clash. This arrangement also allows the use of a synchronizer in high rolling resistance vehicles, which previously precluded the use of such a device. These resulting advantages are accomplished by utilizing as a synchronizing force the inertial effect or drive effect of the clutch members rather than the inertial effect of the vehicle itself. In previous transmission mechanisms designs, high clutch inertias have been completely detrimental and in effect, undesirable in effecting a gear shift, while in the present design, this clutch inertial force is utilized to a good advantage and, in fact, aids in the complete synchronization.

While in the above specification I have described one embodiment which my invention may assume in practice, it will, of course, be understood that the same is capable of modification and that modification may be made without departing from the spirit and scope of the invention as expressed in the appended claims.

What I claim as my invention and desire to secure by Letters Patent is:

1. A transmission mechanism comprising a rotatably mounted input shaft, a tubular first countershaft member rotatably mounted parallel to said input shaft, a rotatably mounted second countershaft member extending through said tubular first countershaft member, a rotatably mounted output shaft member axially aligned with said countershaft members, a plurality of driving members on said input shaft for transmitting power to said countershaft members, a driven member on said first countershaft member operatively connectible with one of said driving members on said input shaft, clutch means operable to operatively connect said first countershaft member and said input shaft through said driven member on said first countershaft member and said one driving member on said input shaft, a driven member on said second countershaft member operatively connectible with another of said driving members on said input shaft, clutch means operable to operatively connect said second countershaft member and said input shaft through said driven mmeber on said second countershaft member and said other driving member on said input shaft, and a planetary gear system operatively connecting said countershaft members to said output shaft member, said planetary gear system including a first planetary gear member carried by and rotatable with said first countershaft member, a second planetary gear member carried by and rotatable with said second countershaft member, and a third planetary gear member carried by and rotatable with said output shaft member, said first, second and third planetary gear members being in operative engagement with one another.

2. A transmission mechanism as defined in claim 1 wherein said first planetary gear member comprises a carrier secured to said first countershaft member and a planetary pinion rotatably mounted on said carrier at a point eccentric with respect to the first countershaft member, said second planetary gear member comprising a sun gear secured to said second countershaft member and meshing with said planetary pinion, and said third planetary gear member comprising an internally toothed-ring gear secured to said output shaft member and meshing with said planetary pinion.

3. A transmission mechanism as claimed in claim 1, including brake means operable to restrain said first countershaft member from rotation while said input shaft and said output shaft members are rotating.

4. A transmission mechanism as claimed in claim 1, including brake means operable to restrain said second countershaft member from rotation while said input shaft and said output shaft members are rotating.

5. A transmission mechanism as claimed in claim 1, wherein said input shaft is tubular and has extending therethrough a rotatably mounted power take-off shaft operable independently thereof.

6. A transmission mechanism as claimed in claim 1, wherein one of said clutch means is hydraulically operable and said input shaft is tubular and has extending therethrough a rotatably mounted power take-off shaft operable independently thereof, said power take-off shaft having a pump operatively connected thereto for hydraulically operating said one clutch means.

7. A transmission mechanism comprising a rotatably mounted input shaft, a tubular first countershaft member rotatably mounted parallel to said input shaft, a rotatably mounted second countershaft member extending through said tubular first countershaft member, a rotatably mounted output shaft member axially aligned with said countershaft members, a plurality of driving members on said input shaft for transmitting power to said countershaft members, a plurality of driven members on one of said countershaft members operatively connectible with certain of said driving members on said input shaft, clutch means selectively operable to operatively connect said one countershaft member and said input shaft through a selected set of driving and driven members selected from said certain driving members on said input shaft and said driven members on said one countershaft member, a driven member on the other of said countershaft members operatively connectible with another of said driving members on said input shaft, clutch means operable to operatively connect said other countershaft member and said input shaft through said driven member on said other countershaft member and said other driving member on said input shaft, and a planetary gear system operatively connecting said countershaft members to said output shaft member, said planetary gear system including a first planetary gear member carried by and rotatable with said first countershaft member, a second planetary gear member carried by and rotatable with said second countershaft member, and a third planetary gear member carried by and rotatable with said output shaft member, said first, second and third planetary gear members being in operative engagement with one another.

8. A transmission mechanism as defined in claim 7 wherein said first planetary gear member comprises a carrier secured to said first countershaft member and a planetary pinion rotatably mounted on said carrier at a point eccentric with respect to the first countershaft member, said second planetary gear member comprising a sun gear secured to said second countershaft member and meshing with said planetary pinion, and said third planetary gear member comprising an internally-toothed ring gear secured to said output shaft member and meshing with said planetary pinion.

9. A transmission mechanism as claimed in claim 7, including brake means operable to restrain said first countershaft member from rotation while said input shaft and said output shaft member are rotating.

10. A transmission mechanism as claimed in claim 7, including brake means operable to restrain said second countershaft member from rotation while said input shaft and said output shaft member are rotating.

11. A transmission mechanism as claimed in claim 7, wherein said input shaft is tubular and has extending therethrough a rotatably mounted power take-off shaft operable independently thereof.

12. A transmission mechanism as claimed in claim 7, wherein one of said clutch means is hydraulically operable and said input shaft is tubular and has extending therethrough a rotatably mounted power take-off shaft operable independently thereof, said power take-off shaft having a pump operatively connected thereto for hydraulically operating said one clutch means.

13. A transmission mechanism comprising a housing, a tubular input shaft rotatably mounted in said housing, a tubular first countershaft member rotatably mounted in said housing parallel to said input shaft, a second countershaft member rotatably mounted in said housing and extending through said tubular first countershaft member, an output shaft member rotatably mounted in said housing axially of said countershaft members, a plurality of driving members on said input shaft for transmitting power to said countershaft members, a driven member on said first countershaft member operatively connectible with one of said driving members on said input shaft, clutch means in said housing operable to operatively connect said first countershaft member and said input shaft through said driven member on said first countershaft member and said one driving member on said input shaft, first brake means in said housing operable to restrain said first countershaft member from rotation while said input shaft and said output shaft member are rotating, means for hydraulically operating said first brake means, a driven member on said second countershaft member operatively connectible with another of said driving members on said input shaft, clutch means in said housing operable to operatively connect said second countershaft member and said input shaft through said driven member on said second countershaft member and said other driving member on said input shaft, second brake means in said housing operable to restrain said second countershaft member from rotation while said input shaft and said output shaft member are rotating, means for hydraulically operating said second brake means, means for hydraulically operating one of said clutch means, a power take-off shaft rotatably mounted in said housing and extending through said tubular input shaft and operable independently thereof, a reservoir for hydraulic fluid in said housing, a pump operatively connected to said power take-off shaft for driving thereby and having an inlet connected to said reservoir and having an outlet, control valve means connected to said outlet and to said hydraulic operating means for said brake means and said one clutch means and operable to selectively hydraulically operate said brake means and said one clutch means, and a planetary gear system operatively connecting said countershaft members to said output shaft member, said planetary gear system including a first planetary gear member carried by and rotatable with said first countershaft member, a second planetary gear member carried by and rotatable with said second countershaft member, and a third planetary gear member carried by and rotatable with said output shaft member, said first, second and third planetary gear members being in operative engagement with one another.

14. A transmission mechanism comprising a housing, a tubular input shaft rotatably mounted in said housing, a tubular first countershaft member rotatably mounted in said housing parallel to said input shaft, a second countershaft member rotatably mounted in said housing and extending through said tubular first countershaft member, an output shaft member rotatably mounted in said housing axially of said countershaft members, a plurality of driving members on said input shaft for transmitting power to said countershaft members, a plurality of driven members on one of said countershaft members operatively connectible with certain of said driving members on said input shaft, clutch means in said housing selectively operable to operatively connect said one countershaft member and said input shaft through a selected set of driving and driven members selected from said certain driving members on said input shaft and said driven members on said one countershaft member, first brake means in said housing operable to restrain said one countershaft member from rotation while said input shaft and said output shaft member are rotating, means for hydraulically operating said first brake means, a driven member on the other of said countershaft members operatively connectible with another of said driving members on said input shaft, clutch means in said housing operable to operatively connect said other countershaft member and said input shaft through said driven member on said other countershaft member and said other driving member on said input shaft, second brake means in said housing operable to restrain said other countershaft member from rotation while said input shaft and said output shaft member are rotating, means for hydraulically operating said second brake means, means for hydraulically operating one of said clutch means, a power take-off shaft rotatably mounted in said housing and extending through said tubular input shaft and operable independently thereof, a reservoir for hydraulic fluid in said housing, a pump operatively connected to said power take-off shaft for driving thereby and having an inlet connected to said reservoir and having an outlet, control valve means connected to said outlet and to said hydraulic operating means for said brake means and said one clutch means and operable to selectively hydraulically operate said brake means and said one clutch means, and a planetary gear system operatively connecting said countershaft members to said output shaft member, said planetary gear system including a first planetary gear member carried by and rotatable with said first countershaft member, a second planetary gear member carried by and rotatable with said second countershaft member, and a third planetary gear member carried by and rotatable with said output shaft member, said first, second and third planetary gear members being in operative engagement with one another.

References Cited in the file of this patent
UNITED STATES PATENTS 2,465,885     Koster et al. _____ Mar. 29, 1949